P. BILYEN, Sr.
Land-Roller.
No. 160,147.
Patented Feb. 23, 1875.
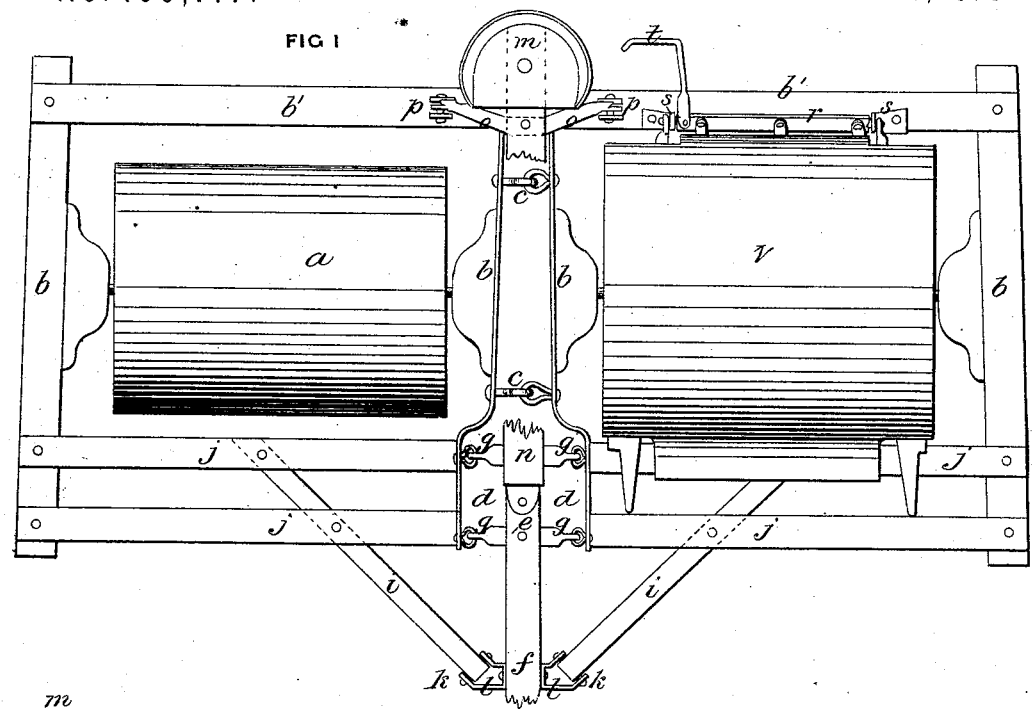
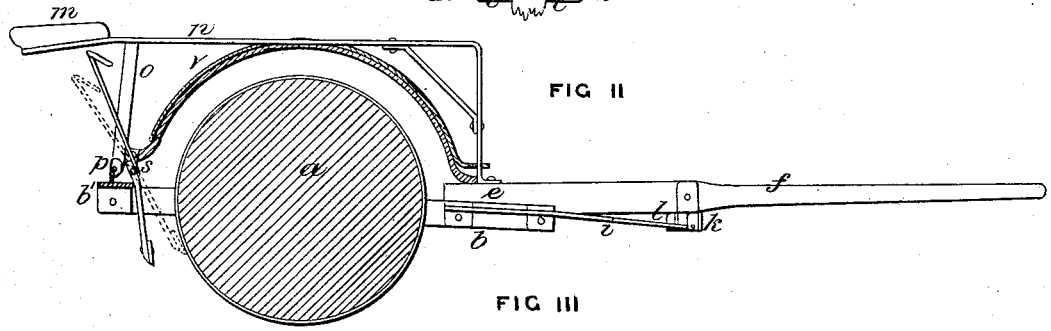
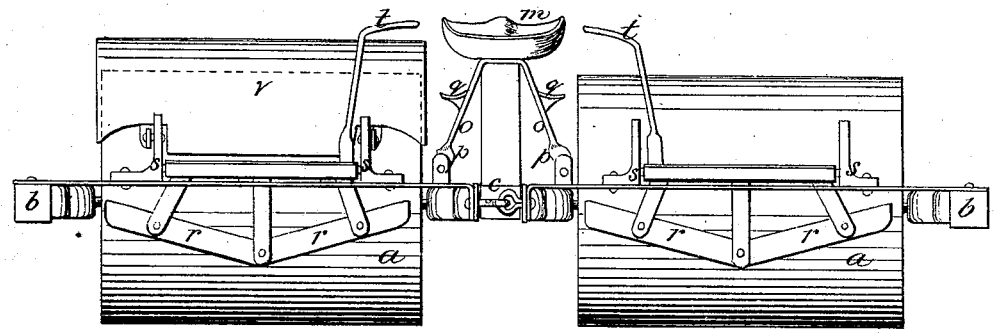

UNITED STATES PATENT OFFICE.

PETER BILYEN, SR., OF MOWEAQUA, ILLINOIS.

IMPROVEMENT IN LAND-ROLLERS.

Specification forming part of Letters Patent No. 160,147, dated February 23, 1875; application filed October 12, 1874.

*To all whom it may concern:*

Be it known that I, PETER BILYEN, Sr., of Moweaqua, in the county of Shelby and State of Illinois, have invented certain new and useful Improvements in Land-Rollers; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to rollers for rolling and pulverizing land, to keep it in good and serviceable condition to receive the seed, and break up lumps or clods, which are so detrimental to the soil and a hinderance in planting. For this purpose rollers have been constructed in various ways, and hinged so as to yield to the uneven surface of the ground.

The improvement claimed consists in the combination, with separate roller-frames connected by eye-joints, of the tongue, jointed to and between the front corners of said frames, and the diagonal draft-braces, which unite the separate roller-frames with the separate hinged tongue, the former being united by joints independent of those of the tongue, and the latter connected and braced by double side joints between said frames, thus relieving the frame joints and roller bearings of all strain and twisting, and affording a very durable attachment for these parts, by the arrangement of the double eye-joints and the tongue within the enlarged space between the front portions of the frames.

In the accompanying drawings, Figure 1 represents a top view of a land-roller embracing my invention; Fig. 2, a vertical section; and Fig. 3, a rear view.

The rollers $a$ $a$ are of any suitable construction, preferably of cast-iron, and mounted in suitable bearings in frames $b$, with their axes in line with each other, and they are about three feet in diameter. The roller-frames $b$ $b$ are jointed together by hinges $c$ $c$, made of about three-quarter round iron, and the space between the contiguous sides of the frames is about two or three inches wide for about two-thirds their length, while the space $d$ $d$ between their front portions is great enough to receive the near end $e$ of the tongue $f$, and allow it to be jointed to the sides of the roller-frames by double hinges $g$ $g$ within the enlarged space $d$ $d$, formed to receive the tongue, so that the roller-frames are not only jointed to each other, but to the tongue, and upon these hinges the roller-frames can rise and fall at either end, to conform to the inequalities in the surface of the ground. The tongue, however, does not draw the rollers by its hinged connection therewith, but by means of diagonal braces $i$ $i$, secured to the front bars $j$ of the roller-frames, and connected to the tongue by hinge-joints $k$ $k$, formed in a cast-iron box, $l$, secured to the under side of said tongue, a suitable distance in advance of the roller-frames, and thereby greatly increase the durability of the machine and the hinges by drawing the heavy rollers directly by the diagonal hinged bars $i$ $i$, which, it will be seen, serve also as braces to prevent lateral movement or wabbling of the frames.

The driver's seat $m$ is carried by a bar, $n$, supported at its front end upon the end of the tongue embraced by the frames, and at its other end by a spring-bar, $o$, the arms of which are connected by strong joints $p$ $p$ to the rear corners of the roller-frames, to allow the latter to have their movement on these joints, and such movement being accommodated by the spring in the arms, giving to the seat a slight rising and falling while having rigid connection therewith. The side arms of the bar $o$ are provided with foot-rests for the driver. Each roller is provided with a scraper, $r$, pivoted at $s$ $s$, so as to hang by its own weight, with its acting surface away from the surface of the roller, as shown in Fig. 2, and the scrapers are provided at their inner ends with handles or levers $t$ $t$, extending upward within reach of the driver, so that by grasping the lever he can bring the scraping-edge inward against the roller, and scrape off any earth adhering thereto, and releasing his hold will carry the scrapers by their weight away from the rollers.

The scrapers are made pointed, or double inclined, the better to cut and scrape off the wet earth, and to conform to the surface of the roller. This automatic action of the scrapers is important to prevent the unnecessary wear both of the rollers and the scrapers, for, when the soil is dry, it will not adhere to the rollers but little, while in wet soil, or during a rain, it will clog the rollers, and for this reason the scrapers are brought into and out of action as required.

The rear bars $b'$ of the frames act as stops to hold the scrapers in place, and prevent their swinging when not in use. The rollers are provided with covers $v$, hinged to the same brackets which carry the pivot $s$ of the scrapers. These covers are chiefly to protect the rollers from rusting by rain when not in use, and they may or may not be employed.

All the parts and joints are to be made in the strongest manner, and of any suitable material.

I am aware that land-rollers have been made with jointed frames, so as to rise and fall independently of each other, and that such frames have been hinged by couplings to a tongue-rod, upon which the inner roller-bearings are arranged by a swiveling coupling; but it is obvious that the least twisting-strain upon the frames will bind the swiveling-coupling bearings, and either break or soon cut them out. I do not claim such construction, as my plan is designed to remedy these objections.

I claim—

In a land-roller, the separate roller-frames, each carrying its roller-bearings, jointed together at $c\ c$, with the tongue jointed to and between the front portions of said frames by the double joints $g\ g$, in the space $d$, and the diagonal draft-braces $i\ i$, all arranged substantially as herein set forth.

In testimony that I claim the foregoing as my own I have affixed my signature in presence of two witnesses.

PETER BILYEN, Sr.

Witnesses:
 CHAS. A. MANNERS,
 WM. A. GOODRICH.